June 16, 1925.  1,542,663

J. BRENZINGER

CAN BODY AND METHOD OF PRODUCING SAME

Filed June 13, 1922

INVENTOR
Julius Brenzinger
BY
ATTORNEY

Patented June 16, 1925.

1,542,003

UNITED STATES PATENT OFFICE.

JULIUS BRENZINGER, OF FAIRFIELD, CONNECTICUT, ASSIGNOR TO THE MAX AMS MACHINE COMPANY, OF BRIDGEPORT, CONNECTICUT, A CORPORATION OF NEW YORK.

CAN BODY AND METHOD OF PRODUCING SAME.

Application filed June 13, 1922. Serial No. 568,070.

*To all whom it may concern:*

Be it known that I, JULIUS BRENZINGER, a citizen of the United States, and a resident of Fairfield, in the county of Fairfield and State of Connecticut, have invented certain new and useful Improvements in Can Bodies and Methods of Producing Same, of which the following is a specification.

This invention relates to can bodies and to a method of producing the same, and has for its main object and feature the saving of extra metal needed to produce a lock seam longitudinally of the body by obviating the necessity of the use of a lock seam.

Heretofore, in the art of making can bodies, it has been necessary, in order to get a tight joint, to use a lock seam, that is: to use interlocking hooks. It will be understood that to produce these hooks extra metal is needed in the blank, and that it has to be made larger by the amount of metal required to form the hooks.

I have found that an ordinary lap seam, devoid of hooks, may be used, and may be made strong enough by spot welding to resist the natural tendency of the blank to open up and be made perfectly tight by soldering, thereby enabling me to make the same size of can body as heretofore from a smaller blank.

In the accompanying drawings the invention is disclosed in a concrete and preferred form in which.

Figure 1:
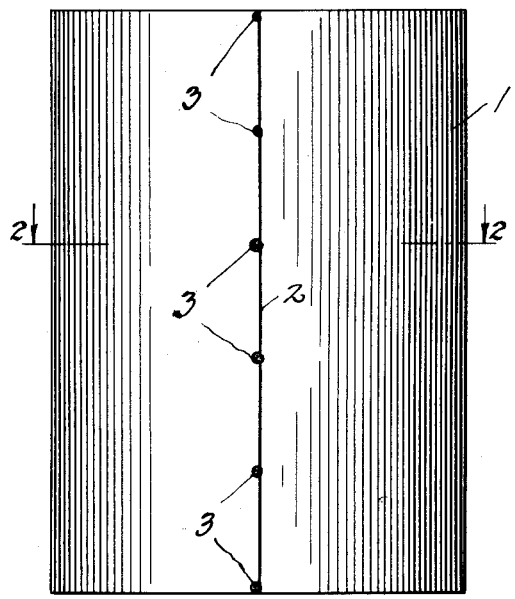
Fig. 1 is a view in elevation of a can body showing a spot-welded lap seam.
Figure 2:
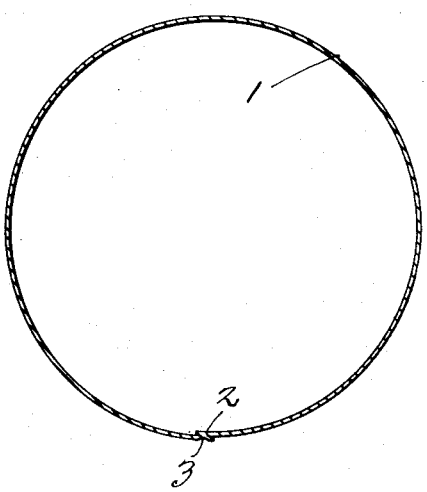
Fig. 2 is a sectional view thereof on the line 2—2 of Fig. 1.
Figure 3:
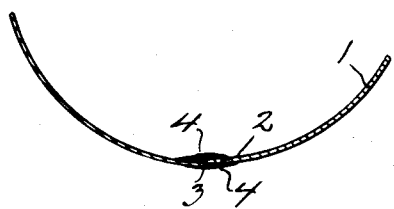
Fig. 3 is a fragmentary view similar to the section shown in Fig. 2 showing solder applied to both the exterior and interior of the body.
Figure 4:
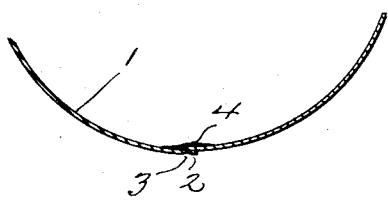
Fig. 4 is a view similar to Fig. 3 showing solder applied to one side of the body only.

1 indicates a blank bent into body formation with overlapping ends to form a lap joint 2 throughout its length. 3 denotes spot welds at intervals throughout the length of the can body along the lap seam. 4 is a body of solder which, as shown in Fig. 3, may cover the lap seam both inside and outside the body, or, as shown in Fig. 4 may cover only one side of the seam. If the body is to contain material of a character that would attack or be affected by the parts of the body robbed of tin covering by the spot-welding, it is desirable to have the inside solder body to protect the spot-welded parts.

I claim:

1. As a new article of manufacture, a can body formed from a blank having overlapping ends constituting a lap seam extending throughout the length of the can body, said overlapping ends permanently secured together by electric welds at a plurality of points throughout the length of the can body and said lap seam covered by a body of solder throughout its length.

2. As a new article of manufacture, a can body formed from a blank having overlapping ends constituting a lap seam extending throughout the length of the can body, said overlapping ends permanently secured together by electric welds at a plurality of points throughout the length of the can body and said lap seam covered by a body of solder both exteriorly and interiorly of the body throughout its length.

3. The method of producing a can body, comprising bending a blank into shape with the ends of the blank overlapping to form a lap seam longitudinally of the body, then permanently securing said overlapping ends together by welding them electrically, and then covering the welded lap seam throughout its length with solder.

4. The method of producing a can body, comprising bending a blank into shape with the ends of the blank overlapping to form a lap seam longitudinally of the body, then permanently securing said overlapping ends together by welding them electrically, and then covering the welded lap seam throughout its length with solder both exteriorly and interiorly of the body.

Signed at Bridgeport, in the county of Fairfield and State of Connecticut, this 5 day of June, 1922.

JULIUS BRENZINGER.